Feb. 18, 1941.     H. L. TEVES     2,232,573
AIR OUTLET DEVICE
Filed Oct. 8, 1937
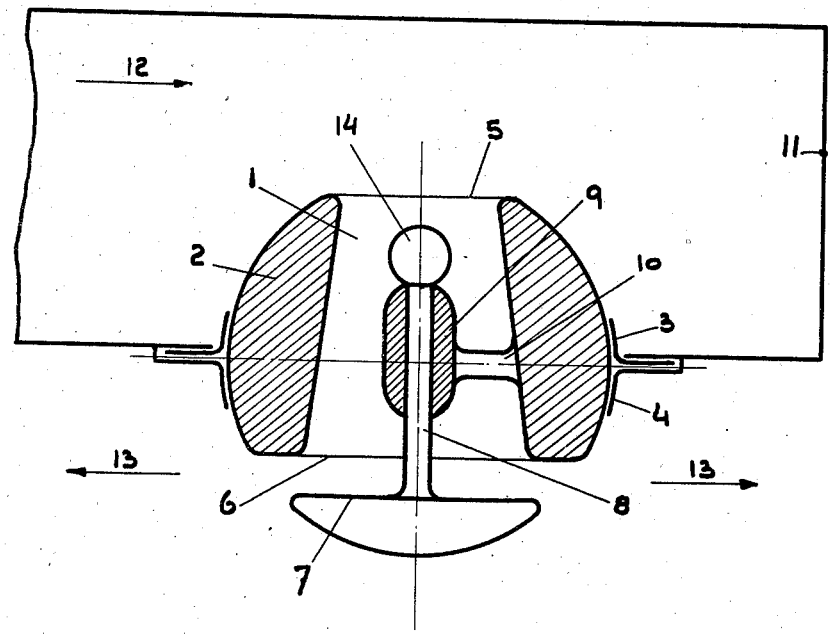
Inventor
Hendrik Lodewijk Teves
By Patented Feb. 18, 1941

2,232,573

UNITED STATES PATENT OFFICE 2,232,573

AIR OUTLET DEVICE

Hendrik Lodewijk Teves, Breukelen, Netherlands

Application October 8, 1937, Serial No. 167,886
In Germany July 22, 1937

4 Claims. (Cl. 98—41)

This invention relates to an improved mouthpiece or outlet device for use with apparatus for blowing air in a concentrated or diffused current into rooms or enclosed spaces, for example ships' holds, or for the ventilation of railway carriages and aircraft cabins and the like, in which a blast nozzle open on two sides is arranged in a spherical member rotatable in all directions, under one opening of which nozzle a deflector is provided for producing a diffused air current.

Air outlet devices for this kind are described in British specification No. 350,244, and have the disadvantage that owing to the fact that said deflector lies outside the area of the spherical member, the possibility of altering the direction of the concentrated air current is considerably limited and thus the degree of usefulness of the apparatus is essentially lessened.

The object of this invention is to overcome these disadvantages and to this end, according to the invention, the member forming the deflector surface forms a part of the rotatable spherical member, for example the back of the deflector surface member may be formed as a calotte of the solid or hollow spherical outlet device.

The deflector, formed at the same time as a closing member for the nozzle, may be arranged so as to be displaceable into the interior of the sphere and thus the outlet device is rotatable into any working position as desired.

Furthermore, as the outlet openings for the concentrated and for the diffused air current are entirely separated from one another any desired direction can also be given in accordance with this invention to the concentrated air current.

In order that the invention may be fully understood I will now describe one embodiment by way of example by reference to the accompanying drawing, which shows a device, constructed in accordance with the invention, diagrammatically in section.

Referring to the drawing:

1 indicates a blast nozzle formed cylindrical or conical, which lies in the solid or hollow spherical air outlet 2, which, for its part, is rotatably arranged as a snug fit in a support formed by the cup-shaped bearings 3, 4.

The outlet openings of the nozzle are indicated at 5 and 6. In front of or beneath the nozzle opening 6 is arranged a deflector member 7 having a flat deflecting surface, the back or rear side of which may be curved, as shown, or of any other suitable shape. The deflector 7, being connected with the hollow outlet 2, is rotatable therewith in the support formed by the bearings 3, 4.

The deflector surface 7 is formed with a spindle 8 which is displaceably mounted in a socket 9. The said guide socket 9 is secured in known manner by means of one or more arms or spokes 10 to the inner wall of the nozzle 1. The deflector surface 7 can be displaced towards the centre of the spherical member 2 so as to close the nozzle opening 6, the spindle 8 being correspondingly moved into the socket 9.

In the opposite direction the degree of movement of the spindle 8 is limited by a stop 14 formed, for example, as a ball, such that the deflector member 7 is constantly retained within the peripheral line of the spherical outlet member 2. In the example shown in the drawing, the outermost position of the deflector member 7 is such that the rear side thereof lies in the peripheral line of the outlet member 2 and is shaped to coincide therewith throughout its width.

The stop 14 may, if desired, be made adjustable for the purpose of varying the amount of movement of the spindle 8.

If the apparatus is arranged, for example, in an air feed channel 11 and the air is fed in the direction of the arrow 12, then, with the parts in the position shown, the air will pass outwardly through the nozzle opening 5, will strike the deflector surface 7 and, bent thereby in all directions, will enter into the room as a diffused air current in the direction of the arrows 13. In this way, by means of this apparatus it is possible to vary the direction of the middle axis of the air current.

By displacing the deflector member 7 towards the inside of the spherical member 2 the size of the air outlet opening for the diffused air current can be varied and also the nozzle opening 6 can be completely closed. If the spherical outlet device is rotated so far that the nozzle opening 5 projects out of the air channel 11 into the room, then the air enters the apparatus through the opening 6 and enters the room through the opening 5 as a concentrated air current, the direction of the middle axis of which can be altered as desired by rotation of the spherical member 2. Moreover, with this position of the outlet device the force and quantity of the outflowing air current can be influenced and even completely shut off by suitable variation of the position of the deflector member 7 towards the interior of the spherical member 2, for example by drawing up the ball-shaped knob 14.

In the drawing the deflector member has been shown as having a flat deflecting surface. It can, however, have any other suitable form within the scope of the invention, for example it can be formed as a rotation body of a curve or the like corresponding to definite requirements as to conical dispersing forms.

I claim:

1. An air outlet device for use with apparatus of the type specified comprising: a support; a spherical outlet member rotatably mounted in said support, a blast nozzle having openings on two sides in said outlet member; a movable deflector member associated with said outlet member and located beneath one of the openings thereof and supporting means for said deflector carried by said outlet member, said deflector and supporting means being located wholly within the sphere containing said outlet member, whereby said outlet member may be rotated in said support in any desired direction and through any desired angle, including a full rotation.

2. An air outlet device for use with apparatus of the type specified comprising: a support; a spherical outlet member rotatably mounted in said support; a blast nozzle having openings on two sides in said outlet member; a movable deflector member associated with said outlet member and located beneath one of the openings thereof; supporting means for said deflector carried by said outlet member, said deflector and supporting means being located wholly within the sphere containing said outlet member, whereby said outlet member may be rotated in said support in any desired direction and through any desired angle, including a full rotation; and means for moving said deflector towards and away from the interior of said nozzle.

3. An air outlet device for use with apparatus of the type specified comprising: a support; a spherical outlet member rotatably mounted in said support; a blast nozzle having openings on two sides in said outlet member; a movable deflector member associated with said outlet member and located beneath one of the openings thereof; supporting means for said deflector carried by said outlet member, said deflector and supporting means being located wholly within the sphere containing said outlet member, whereby said outlet member may be rotated in said support in any desired direction and through any desired angle, including a full rotation; means for moving said deflector towards and away from the interior of said nozzle; and stop means associated with said supporting means for limiting movement of said deflector in an outward direction.

4. An air outlet device for use with apparatus of the type specified comprising: a support; a spherical outlet member rotatably mounted in said support; a blast nozzle having openings therein on two sides in said outlet member; a socket secured to said outlet member within said nozzle; a spindle slidably engaging said socket, said spindle projecting outwardly through one of the openings in said nozzle; a deflector member carried by the outer end of said spindle and a knob carried by the inner end of said spindle, said knob co-operating with said socket to limit the outward movement of said deflector member, and said deflector member, knob, spindle and socket being located wholly within the sphere containing the outlet member.

HENDRIK LODEWIJK TEVES.